UNITED STATES PATENT OFFICE.

LUDWIG GROTE, OF DRESDEN, GERMANY.

MANUFACTURE OF ARTIFICIAL STONE.

SPECIFICATION forming part of Letters Patent No. 464,120, dated December 1, 1891.

Application filed April 16, 1891. Serial No. 389,194. (No specimens.)

*To all whom it may concern:*

Be it known that I, LUDWIG GROTE, a subject of the King of Saxony, residing at the city of Dresden, in the Kingdom of Saxony, German Empire, have invented a certain new and useful Improved Manufacture of Artificial Stone, of which the following is a specification.

The object of this invention is the manufacture of a mass of the nature of stone which is semi-liquid or plastic while being shaped or molded, but becomes capable of being turned in a lathe and ground or polished while it is solidifying—*i. e.*, before it is completely hardened. The many methods which have hitherto been adopted in manufacturing similar masses mainly consisted in applying high pressure in molding and only enabled a material to be obtained which might be sawed or bored, but not turned and polished. The main advantage of this invention therefore is that the substances to be mixed and the mixture, when ready, are treated in such a manner that no pressure is necessary in the molding process and that the hardening of the mass lasts a certain space of time, which permits the molded articles to be turned true or polished before the hardening is complete. To attain this result, cellulose is steeped in oxide-of-copper ammonia (*kupferoxyd amoniak*) and when thoroughly soaked freed from the superfluous liquid, so as to remain in the condition of a thick pulp. What is known as "Sorel's cement" (magnesite containing chlorine) may be employed as filling material, the burnt magnesite being mixed with a solution of chloride of magnesium and chloride of zinc. The pulp thus obtained is dried and heated in tightly-closed vessels, the heating being, however, only kept up long enough and at a sufficiently high temperature to prevent the escape of more than an insignificant quantity of the hydrochloric acid, so that the mixture remains saturated with the chlorides. The mass is then ground or otherwise reduced to a pulverulent condition and mixed with the cellulose in the required proportion, a small quantity of alumina being preferably added. The almost dry pulp thus obtained is forced into molds and exposed to the influence of the air. During the first twelve hours the water rapidly "settles" and the mass becomes strongly heated. During the succeeding twelve hours it partly retains its plasticity, while at the same time it is capable of being turned or polished, the chips or shavings being of a structure somewhat similar to that of wood or horn. At the end of the twenty-fourth hour the mass will be found so hard as no longer to be capable of being worked by tools.

The proportions of the ingredients depend upon the nature of the articles it is intended to produce, and more or less cellulose is to be used, according as it is desired to make these resemble more closely wood, horn, or natural stone.

The following is an approximate recipe, which will be found satisfactory in most cases: fifty grams of dried wood-pulp steeped in fifty grams of oxide-of-copper ammonia, (*kupferoxyd amoniak*,) (one hundred parts in five hundred parts of water,) one thousand grams (thirty-eight per cent.) of chloride of magnesium, and three hundred and fifty grams (thirty-two per cent.) of chloride of zinc, mixed with five hundred grams of burnt magnesite. Both mixtures are then added to each other in the proportion of about one part, by weight, of the "wood" mixture to form three to ten parts of the "stone" mixture. The novel technical result thus obtained consists in the chemical "settling" of the water, which causes the mass to solidify by such slow degrees as to enable the mass to be worked into the desired shape before it entirely hardens.

I claim—

1. The herein-described process of manufacturing artificial stone, consisting in steeping cellulose in oxide-of-copper ammonia, freeing the mixture obtained from superfluous liquid, mixing a filling material consisting of chloride of magnesium, chloride of zinc, and magnesite with the mass, molding the latter into suitable shapes, and then allowing the same to dry and harden.

2. The herein-described composition of matter, consisting of cellulose, oxide-of-copper ammonia, chloride of magnesium, chloride of zinc, and magnesite in or about in the proportions specified.

In testimony whereof I have hereunto set my hand in the presence of two witnesses.

LUDWIG GROTE.

Witnesses:
RUD. SCHMIDT,
PAUL DRUCKMÜLLER.